(12) United States Patent
Clark et al.

(10) Patent No.: US 6,742,659 B2
(45) Date of Patent: Jun. 1, 2004

(54) MULTIPLE WELL PLATE WITH ADHESIVE BONDED FILTER

(75) Inventors: Phillip Clark, Wakefield, MA (US); Kurt Lautenschlager, N. Chelmsford, MA (US)

(73) Assignee: Millipore Corporation, Billerica, MA (US)

( * ) Notice: Subject to any disclaimer, the term of this patent is extended or adjusted under 35 U.S.C. 154(b) by 98 days.

(21) Appl. No.: 09/844,304

(22) Filed: Apr. 27, 2001

(65) Prior Publication Data

US 2001/0042710 A1 Nov. 22, 2001

Related U.S. Application Data

(60) Provisional application No. 60/205,357, filed on May 18, 2000.

(51) Int. Cl.[7] ............................................... B10D 35/00
(52) U.S. Cl. ............ 210/474; 210/321.72; 210/321.75; 210/484; 210/295; 210/483; 422/101; 422/102; 156/268
(58) Field of Search ...................... 210/321.75, 321.84, 210/474, 484, 295, 253, 407, 360.1, 380.1, 451, 321.61, 483; 422/101, 102; 156/60, 62, 49, 257, 295, 268, 513

(56) References Cited

U.S. PATENT DOCUMENTS

| | | | | |
|---|---|---|---|---|
| 4,246,339 A | * | 1/1981 | Cole et al. ................... 435/5 |
| 4,734,192 A | * | 3/1988 | Champion et al. | |
| 4,797,259 A | * | 1/1989 | Matkovich et al. ......... 356/246 |
| 4,902,481 A | * | 2/1990 | Clark et al. | |
| 5,009,780 A | * | 4/1991 | Sarrasin | |
| 5,141,719 A | * | 8/1992 | Fernwood et al. ....... 210/323.1 |
| 5,223,133 A | * | 6/1993 | Clark et al. ................. 210/232 |
| 5,462,874 A | * | 10/1995 | Wolf et al. ............... 435/297.5 |
| 5,647,990 A | * | 7/1997 | Vassarotti | |
| 5,674,395 A | * | 10/1997 | Stankowski et al. | |
| 5,972,694 A | * | 10/1999 | Mathus .................... 435/288.4 |
| 6,159,368 A | * | 12/2000 | Moring et al. | |
| 6,251,343 B1 | * | 6/2001 | Dubrow et al. ............. 422/102 |
| 6,309,605 B1 | * | 10/2001 | Zermani ..................... 210/451 |

FOREIGN PATENT DOCUMENTS

| | | |
|---|---|---|
| EP | 0 098 534 A | 1/1984 |
| EP | 0 408 940 A | 1/1991 |
| GB | 2348622 | * 10/2000 |
| WO | WO 88 06723 A | 9/1988 |
| WO | WO 98 35013 A | 8/1998 |
| WO | WO 01 19502 A | 3/2001 |

OTHER PUBLICATIONS

Copy of International Search Report dated Dec. 18, 2001.

* cited by examiner

*Primary Examiner*—W. L. Walker
*Assistant Examiner*—Krishnan S Menon
(74) *Attorney, Agent, or Firm*—John Dana Hubbard

(57) ABSTRACT

The present invention provides for a multiple well filter plate and method of producing same, the multiple well filter plate comprising a molded plate and a filter sealed via an adhesive, the method particularly adapted for producing multiple well filter plate having substantial well densities and small volume sample wells.

9 Claims, 2 Drawing Sheets

MULTIPLE WELL PLATE WITH ADHESIVE BONDED FILTER

This application claims the benefit of provisional application No. 60/205,337 filed May 18, 2000.

This application relates to a multiple well plate suitable for high throughput sample prep and assays having a filter bonded via an adhesive.

BACKGROUND OF THE INVENTION

The assays being developed by researchers in the genomics, proteomics, ADME/TOX and other markets are moving to higher throughputs with smaller liquid volumes. To address this change, the suppliers of plastic labware have developed multiple well plates. The multiple well plates have steadily increased the number of sample wells from 6 to 12, 24, 96, 384, 1536 and higher densities are expected in the near future.

The filter bottom multiple well plates have lagged behind in array densities because of manufacturing complexities. To further complicate the filter plate manufacturing are the increased performance attributes required in a filter plate. A typical assay run on a solid plastic bottom multiple well plates consists of adding and removing liquids from the opening of the wells with a pipettor, or automated liquid handlers.

The sample preparation methods developed for use with multiple well filter plates typically either filter the sample or concentrate the sample. An example of a method that concentrates the sample would be a bind and elute method, where the filter matrix provides specific binding of a species in the sample solution. When the sample is passed through the filter the species is bound to the matrix and the remaining solution passes through the filter unaltered. A second solution is passed through the filter that elutes the species. This elution solution needs to be collected. Typical devices for this method have an underdrain and spout downstream of the filter to collect the filtrate and direct it to the appropriate well in a collection plate.

An example of a multiple well filter bottom plate being used to filter a sample would be a lysate clearing application. The researcher would lyse a batch of cells, thereby releasing the intercellular matter within the cells. A filter is used to stop the large debris, like the cell walls, while letting components like the DNA to pass freely through the filter. Similarly, the filtered solution is collected into a collection plate by means of an underdrain and a spout.

An example of a product suitable for these two applications is the Multiscreen™ plate, which is manufactured by Millipore Corporation of Bedford, Mass. and is disclosed in U.S. Pat. No. 4,902,481.

Another method of concentrating components in a solution is by using an ultrafiltration filter. When concentrating with an ultrafiltration filter the components of interest are retained or concentrated by the ultrafiltration filter. Typical concentrating devices have been limited to single sample processing devices such as a Centricon® or Microcon® manufactured by Millipore Corporation of Bedford, Mass. which have a single well in the form of a large tube, similar to a test tube and a filter sealed along the side or bottom of the well. One example of a multiple well ultrafiltration device for concentrating a sample is disclosed in U.S. Pat. No. 5,674,395. In this patent, one or more filter panels are secured to the sidewalls of the filter device.

The construction of an ultrafiltration filter has a thin layer of polymer forming an ultrafiltration skin matrix. Typically, the skin matrix is formed on top of a more open supporting structure. This basic construction makes it difficult to seal into plastic devices. The sealing methods used to fabricate plastic devices containing ultrafiltration filters can be put into two categories: seal to the skin matrix or seal through the support structure.

When sealing through the support structure, it is important that the support structure is sealed off from liquid flow. If the support structure is not sealed then the sample will preferentially pass through the support structure because of its open structure relative to the skin matrix, and if that happens the fluid will not be filtered. One sealing method used to seal to the support structure is with heat to collapse the support structure or to fill it with molten plastic from the part to which it is bonded, so that the only filtering path is through the ultrafiltration skin matrix.

When sealing to the skin matrix, gaskets, such as o-rings and elastomeric seals, have provided the most utility in making an integral seal between the housing and skin matrix of the ultrafiltration filter. It has been possible to seal to the skin matrix using adhesives in spiral wound ultrafiltration cartridges, and also a single sample processing centrifuge device described in U.S. Pat. No. 5,647,990. However, this application has not been useful in expanding the role of adhesives for use with UF filters in multiple well plates.

When filtering samples in multiple well array, the cross contamination of samples due to leaks between wells can lead to unacceptable results. The Multiscreen™ product has overcome this problem by isolation of the individual filter in each well. This is typically accomplished by insertion and sealing of individual filters into each well. This can be a time consuming and labor intensive operation especially as one goes to smaller and smaller well diameters (e.g. 384 well plates, etc). Also in those smaller well diameter applications, the ability to effectively seal the individual filters in each well becomes more complicated and difficult. If collection of the filtrate from each well is desired, an underdrain is provided to collect and deliver the filtrate from one well to a corresponding collection well. The underdrain must seal to the downstream side of the filter or plate, which further complicates the manufacturing of such a product.

In some applications, such as cleaning up a PCR product, it is possible to use the size exclusion properties of an ultrafiltration filter. Selecting the appropriate pore size filter and then do repeated washing through the filter to remove the salts and other small impurities, then collect the cleaned PCR product off the filter surface. In this approach the need for individual filters has been eliminated because the sample will be retained on the membrane surface and the smaller unwanted materials will pass through the filter. The limitation to this approach is the entire plate needs to be run and the liquid flowing through the filter should be drawn away to eliminate back migration of small components such as salts from the support structure. The running of an entire plate in the high throughput laboratory is common, actually it would be rare to have applications using partial plates.

It would be desirable to make a multiple well filter plate with an ultrafiltration filter for concentrating samples that does not suffer from crosstalk and is compatible with the methods and equipment used in the high throughput laboratories.

It would be further desirable to make the multiple well plate with one common sheet of ultrafiltration filter so as not to have to cut and position individual filter panels for each sample well.

It would be further desirable to make a multiple well plate with a common sheet of microporous filter suitable for size exclusion concentrating applications.

SUMMARY OF THE INVENTION

The present invention provides a multiple well filter plate comprising of a plastic plate with through holes and a filter sealed to one side of the plate so that each hole and filter form an isolated concentrating well. When liquid is added to the well and a pressure differential is applied to the plate, the liquid passes through the filter.

The present invention provides for a method of producing a multiple well filter devices, the method comprising selecting a suitable plastic for the plate, selecting a suitable filter for the application, and selecting a suitable adhesive for sealing the two together to form an integral liquid tight seal creating isolated concentration wells that do not crosstalk.

The present invention provides a multi well filter plate for filtering a liquid. The plate has top and bottom surfaces and a plurality of holes passing through the plate. An ultrafiltration filter having a first and second layer, where the first layer having a smaller pore size than the second layer. The first layer of the ultrafiltration filter being sealed to the bottom surface of the plate, and the seal is an adhesive. The seal being liquid tight so that when a sample is placed in the holes and a pressure differential is applied between the top and bottom surfaces the liquid passes through the ultrafiltration filter.

The present invention provides a multi well filter plate for filtering a liquid having a plate with top and bottom surfaces and a plurality of holes passing through the plate. An ultrafiltration filter having a first and second layer, where the first layer having a smaller pore size than the second layer. Cuts are made through at least a portion of the upper surface of the filter. The ultrafiltration filter is sealed to the bottom surface of the plate, and the seal is an adhesive bonded between the bottom surface of the plate and said bottom of the cut of the upper surface of the filter. The seal being liquid tight so that when a sample is placed in the holes and a pressure differential is applied between the top and bottom surfaces the liquid passes through the ultrafiltration filter.

The present invention provides a multi well filter plate for filtering a liquid having a plate with top and bottom surfaces and a plurality of holes passing through the plate. An ultrafiltration filter having a first and second layer, where the first layer having a smaller pore size than the second layer. Cuts are made through the first layer in a pattern corresponding to the diameter and configurations of the holes in the plate and up to the second layer of the ultrafiltration filter. The ultrafiltration filter is sealed to the bottom surface of the plate, and the seal is an adhesive bonded between the bottom surface of the plate and said second layer of the filter through the cut in the first layer. The seal being liquid tight so that when a sample is placed in the holes and a pressure differential is applied between the top and bottom surfaces the liquid passes through the ultrafiltration filter.

The present invention provides a multi well filter plate for filtering a liquid. The plate has top and bottom surfaces and a plurality of holes passing through the plate. A microporous filter having a top and bottom surface. The top surface of the filter is sealed to the bottom surface of the plate, and the seal is an adhesive. The seal being liquid tight so that when a sample is placed in the holes and a pressure differential is applied between the top and bottom surfaces the liquid passes through the ultrafiltration filter.

DETAILED DESCRIPTION OF THE SPECIFIC EMBODIMENTS

Figure 1:
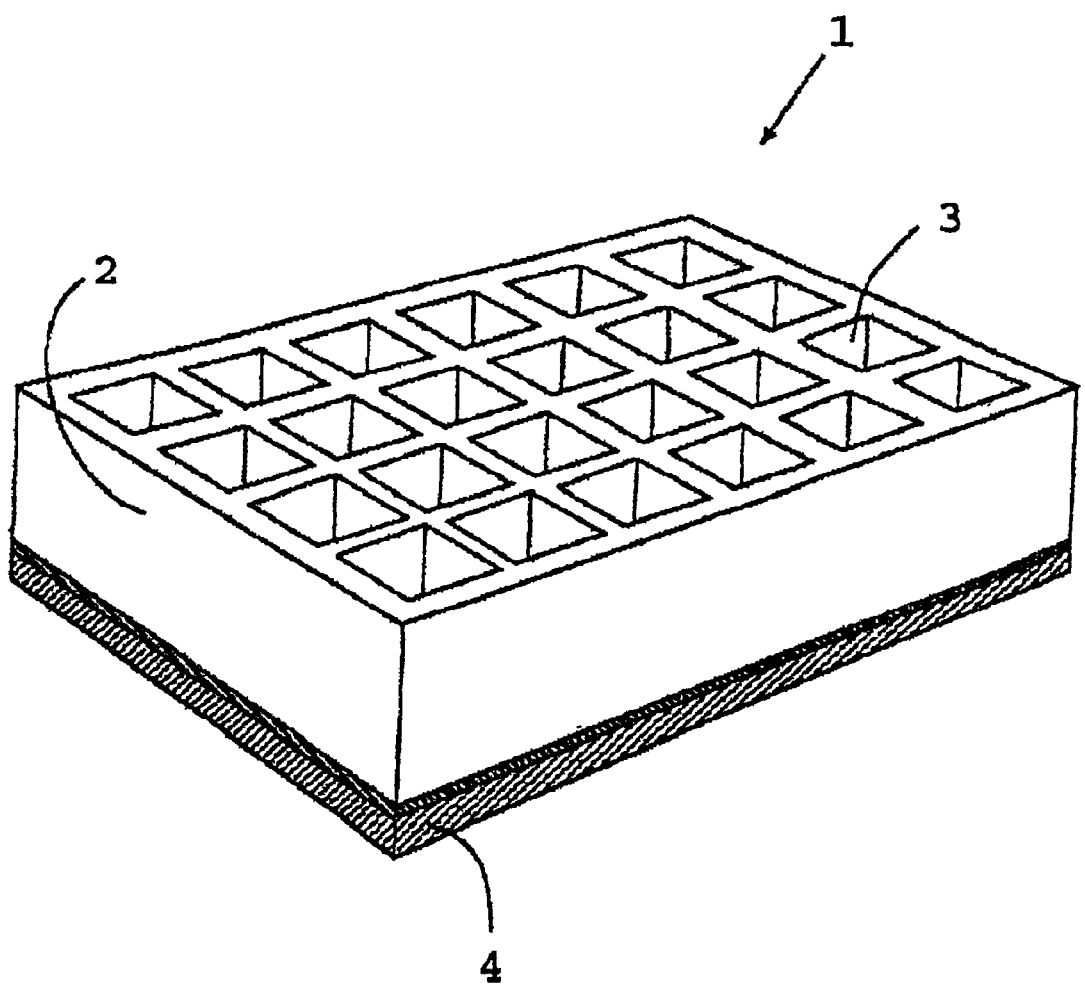
FIG. 1 provides an isometric view of the multiple well plate assembly of this first embodiment of this invention.

The present invention provides for a multiple well filter device as shown in FIG. 1. The device 1 is comprised of a plate 2, a set of holes 3 that pass through the plate 2 and a filter 4 sealed to plate 2 and covering holes 3. The holes 3 with the filter 4 form a set of liquid tight wells for holding a sample to be concentrated. The sample will pass through the filter if a pressure differential is achieved between the top of the holes 3 and the underside of the filter 4. The format of the holes can be a pair of wells or one of the commonly used formats such as 96, 384 or 1536 wells. The shape of the holes 3 can be round, square, polygon, oval or an irregular shape. Not all of the holes 3 need to have the same shape although it is preferred.

Figure 2:
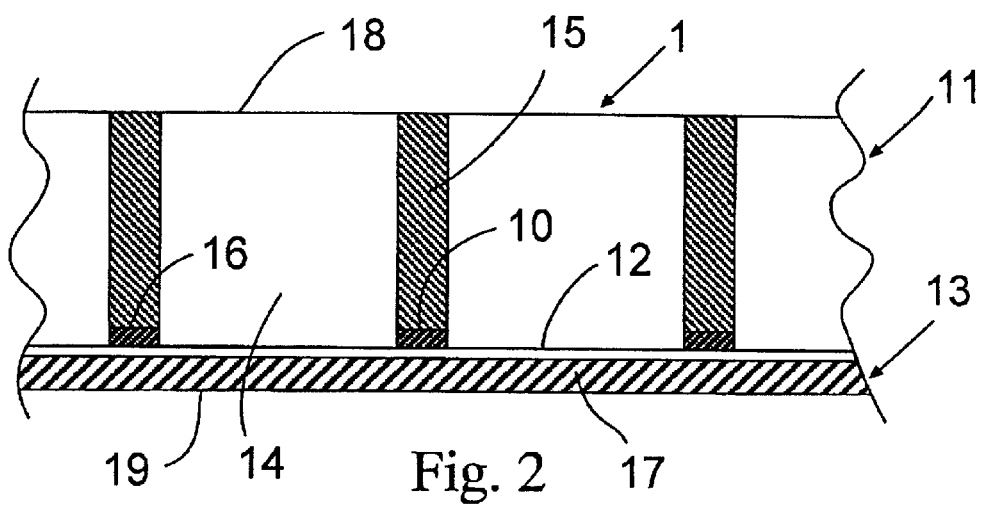
FIG. 2 provides a sectional view of the multiple well plate assembly of the first embodiment of the present invention.

The cross-sectional view of the multiple well filter plate 1 in FIG. 2 shows the preferred filter plate layout. In this layout, the adhesive 10 is suitable for integrally bonding to both the plate 11 material and the upper surface 12 of the filter 13. The plate 11 has a set of holes 14, also referred to as wells, separated by a series of walls 15. The ends of the wells 15 form the plate bottom 16. Adhesive 10 is positioned along the bottom 16 in a pattern so that the each hole 14 is circumscribed by adhesive 10. The filter 13 in the preferred embodiment is an ultrafiltration filter, and is positioned with an upper surface 12 against the adhesive 10. A support matrix 17 is downstream of the upper surface 12. The sample when added to well 14 is drawn through the filter 13 if a differential pressure is applied between the top surface 18 and the filter underside 19. The retained compounds in the liquid in the wells will not crosstalk with an adjacent well because the adhesive 10 is in a sealing relationship with the well ends 4 and the upper surface 12.

Figure 3:
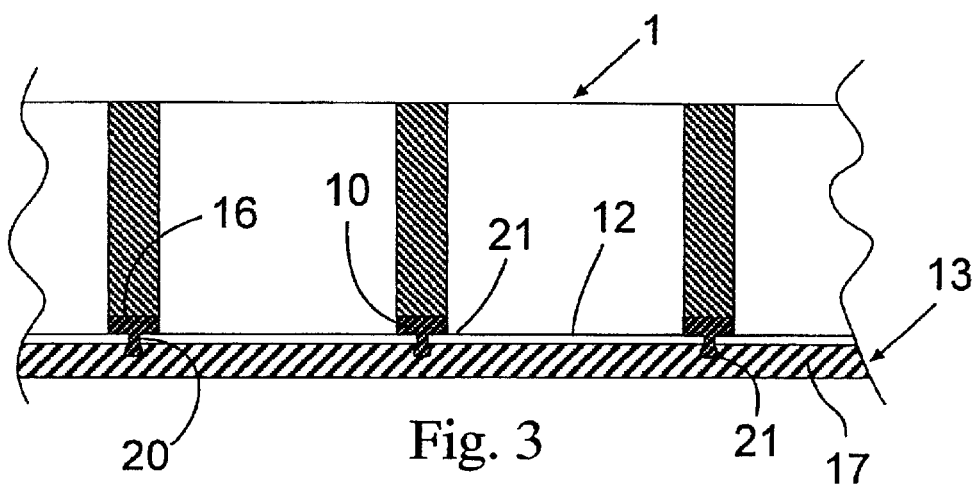
FIG. 3 provides a sectional view of the multiple well plate assembly of the second embodiment of the present invention.

A second cross-sectional view of the multiple well plate 1 is shown in FIG. 3. The upper surface 12 in this assembly does not integrally seal to the adhesive 10, therefore a cut 20 is made in the upper surface 12 so the adhesive 10 can flow into the filter support 17 to form an interlock 21 that captures the upper surface 12 and forms a liquid tight seal between the filter 13 and the plate surface 16 to which it is attached.

Figure 4:
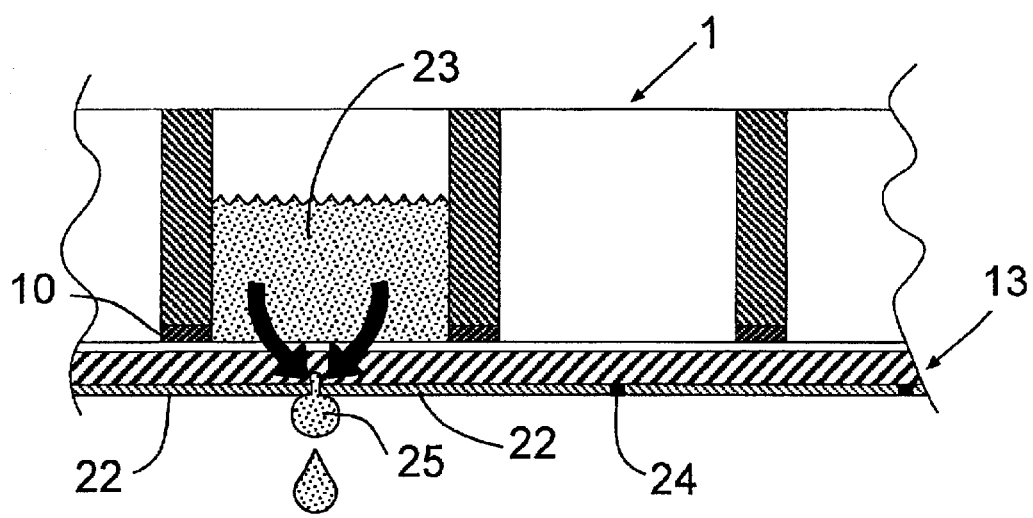
FIG. 4 provides a sectional view of the multiple well plate assembly of the third embodiment of the present invention.

The samples in the wells are drawn through a filter and the filter retains the compounds of interest. The liquid passing through the filter is typically drawn to waste. In some applications it is important that the liquid passing through the filter be pulled away from the filter to waste so that salts or other small compounds do not back migrate once the liquid flow has stopped. In FIG. 4, the multiple well plate 1 has an ultrafiltration filter 13 sealed to the plate wells by means of an adhesive 10 as described in FIGS. 1 and 2. Additionally, a liquid director 22 is provided so that when the sample 23 is filtered through ultrafiltration filter 13 it is directed to flow through openings 24. The liquid exits the multiple well plate underside in predetermined locations. It is envisioned that for some applications the opening may include spouts to further direct the exiting liquid. It also is envisioned that a complimentary array would be positioned below the openings to facilitate collecting the filtrate 25 to the appropriate well.

The present invention provides a method of producing a multi-well filter device. The method comprising selecting a pre-formed plate having top and bottom surfaces suitable for affixing a filter thereto. The plate has one or more through holes formed from the top surface to the bottom surface. Selecting a filter suitable for filtering solutions and suitable for adhering the filter to the bottom surface of the plate forming a well.

Preferably, the method of the present invention includes selecting a pre-formed plate of suitable size and with through holes arranged in the desired pattern. The material of the plate and the filter do not need to be compatible with each other as is required in devices that use a thermal bonding process. The material of the plate and the filter simply need to be capable for bonding with the adhesive selected.

The plate should be relatively rigid or self-supporting to allow for easy handling during manufacturing and easy handling during use by the end user (a human or a robot). Preferably the plate may be made of polymeric, especially thermoplastic materials, glass, metallic materials, ceramic materials, elastomeric materials, coated cellulosic materials and combinations thereof such as epoxy impregnated glass mats. In a more preferable embodiment, the plate is formed of a polymeric material including but not limited to polyethylene, acrylic, polycarbonate and styrene. The wells can be made by injection molding, drilling, punching and any other method well known for forming holes in the material of selection. Such plates are well known and commercially available from a variety of sources in a variety of well numbers and designs. Most common are 96 and 384 well plates.

The well format will be determined by the end users needs, but it can have numerous configurations and the wells do not necessarily need to be all of the same shape or size. For example, the wells of the present invention may have round, rectangular, teardrop, square, polygonal and other cross-sectional shapes or combinations of them. Virtually any shape that is required for the product may be provided. Typically, it has the wells arranged in uniformly spaced rows and columns for ease of use.

The device is a multi-well filter configuration having at least 96 wells, preferably more than 96 wells including but not limited to 384, 1536 and 9600 wells. Especially with the smaller sized wells, the wells may have the same or different volumes. The wells may also have different shapes. The plates are typically 5 inches (127 mm) long and 3.4 inches (86.4 mm) wide. The plate thickness can vary but are generally 0.5 inches (12.7 mm) for a standard plate and 1.75 inches 44.45 mm) for a deep well plate.

It is preferred that the present invention be used with ultrafiltration filters (UF) although it will work equally as well with other filters such as microfiltration filters (MF), nanofiltration filters, and coarse or macrofiltration filters.

Ultrafiltration (UF) filters, which may be used in this process, can be formed from the group including but not limited to polysulphones, including polysulphone, polyethersulphone, polyphenylsulphones and polyarylsulphones, polyvinylidene fluoride, and cellulose and its derivatives, such as nitrocellulose and regenerated cellulose. These filters typically include a support layer that is generally formed of a highly porous structure. Typical materials for these support layers include various non-woven materials such as spun bounded polyethylene or polypropylene, paper or glass or microporous materials formed of the same or different polymer as the filter itself.

Alternatively, the support may be an openly porous, asymmetric integral portion of the ultrafiltration filter that may either be formed with or without macrovoids. Such filters are well known in the art, and are commercially available from a variety of sources such as Millipore Corporation of Bedford, Mass.

Preferred UF filters include regenerated cellulose or polysulphone filters such as YM™ or Biomax™ filters available from Millipore Corporation of Bedford, Mass.

Representative suitable microporous filters include nitrocellulose, cellulose acetate, regenerated cellulose, polysulphones including polyethersulphone and polyarylsulphones, polyvinylidene fluoride, polyolefins such as ultrahigh molecular weight polyethylene, low density polyethylene and polypropylene, nylon and other polyamides, PTFE, thermoplastic fluorinated polymers such as poly (TFE-co-PFAVE), polycarbonates or particle filled filters such as EMPORE® filters available from 3M of Minneapolis, Minn. Such filters are well known in the art and available from a variety of sources, such as DURAPORE® filters and EXPRESS® filters available from Millipore Corporation of Bedford, Mass.

The filter is then attached to the plate. A variety of adhesive bonding processes are envisioned and include light curing, air curing, hot melt adhesion, solvent adhesion and other such methods as are well known to one of ordinary skill in the art. Those of ordinary skill in the art would appreciate other means of adhering two layers together.

Preferably, a rapid curing adhesive such as a light curing, cyanoacrylate or thermally activated adhesives are preferred because the product can move continuously through a manufacturing process without the requirements of batch processing. The light curing adhesives are more preferred as the adhesive for attaching the filter to the plate. This is because this type of adhesive has been found to provide a liquid tight seal with a large variety of filters and plate materials and to do so in a continuous manufacturing process. The light curing adhesives such as 3201 and 3211 from Loctite Corporation works well. Other light curing adhesives are well known and readily available from companies such as Dymax of Torrington Conn., Masterbond of Hackensack, N.J., Permabond of Engelwood, N.J. and others.

While light cured adhesives are preferred due to their ease of use, other adhesive systems such as two part epoxies and solvent based adhesive systems can be used successfully in the invention especially when the materials are found to be compatible.

When using adhesives it is required that the adhesive be suitable for bonding to both the plastic part and to the filter and not have any adverse effect on the assay or filter performance.

It is preferred to use adhesives with relatively high viscosity (typically greater than 5000 cps, preferably greater than 7500 cps and more preferably about 10,000 cps), so that the adhesive does not migrate to areas of the filter that otherwise would be used in the filtration process. Any adhesive that migrates outside the seal area will reduce the effective filter area. One high viscosity adhesive is the Loctite 3211 and it has been found suitable for use in this invention.

Alternatively, one may use lower viscosity adhesives in combination with the use of masks to prevent the flow of adhesives to the area of effective filter. One may also form a series of troughs in the bottom of the plate to hold the adhesive and have the filter placed on top of the troughs to contact the adhesive in the proper areas.

Preferably, the filter and plate are clamped together during curing of the adhesive to ensure a good bond between the two. Alternatively, one may use a vacuum applied from the top surface through the holes in the plate; the skin surface of the filter creates resistance to the flow of air causing the filter and plate surface to be in intimate contact with each other. Any other method for ensuring a good bond and seal between the plate and filter may also be used in the present invention.

In some instances, particularly with ultrafiltration filters, which contain high levels of humectants, such as glycerine, adhesion between the plate and the filter may be difficult. Other properties such as thickness of the filter or the need to provide liquid isolation from one well to the next that cannot be accomplished simply by adhering the filter to the bottom of the plate can also take advantage of this embodiment of the present invention. In such instances, it is a preferred method of the present invention to enhance the adhesion by cutting the surface of the filter, which is to be bonded to the bottom surface of the plate. It has been found that by cutting at least partly through the top surface of the filter, in those filters with a skin or top layer to cut through the skin matrix of the filter, the adhesive is able to penetrate the filter to a level below the humectants and form a proper adhesive seal with the filter. The depth of the cut depends upon the structure of the filter, whether it is a supported UF filter versus an unsupported UF filter or MF filter. The depth also depends on the amount of humectants in the filter, if any, and the depth to which the adhesive penetrates the upper surface of the filter which is bonded to the plate and the structure below the cuts. Typically, the humectants in ultrafiltration filters tend to reside within the upper portion of the filter adjacent the surface. Therefore, a complete cut through the surface may not be necessary. Typically, in ultrafiltration filters, one should cut at least part ways through the skin of the filter and preferably through the entire skin layer but not into the support layer below, if used, in order to obtain a suitable and long lasting bond. Alternatively, one may use a cutting tool, laser, sanding disk, or other suitable methods to form the cut.

Various methods may be used to form the cuts through the portion of the filter. One can simply make the cuts by hand using a utility knife or a razor blade. However, this is tedious and exacting work, especially when one is forming cuts used on plates containing 384 wells or more. The use of a mat cutter allows one to make straight cuts a set distance apart. Preferably, an automated X/Y cutting device is used to automate the process and form uniform cuts in the area of the filter, which corresponds, to the solid portions of the bottom of the plate surface. One such machine is used in the vinyl sign cutting industry and is a Studio 7 machine manufactured by IOLINE Inc. of Woodinville, Wash.

After attachment of the filter to the plate and the adhesive has had time to cure the plate may be ready for use, or if necessary it may be treated further as desired.

EXAMPLE 1
384 Well Card with UF Filter

A Biomax® UF filter was cut into a sheet 3"×4.4" The filter sheet was placed in a membrane aligning fixture that held flat and in position by a vacuum. The filter was positioned so that the ultrafiltration skin matrix was facing upward or away from the fixture.

A clear polystyrene bottomless 384 well plate was placed into a fixture on the deck of a liquid dispensing machine manufactured by Astro Dispensing of Franklin Mass. A small bead, less then 0.015" in diameter of Loctite 3211 adhesive was dispensed on the underside of the plate along the walls separating each of the wells. The Loctite 3211 adhesive is a 10,000 cps light activated adhesive.

The plate was positioned into the membrane aligning fixture so that the underside of the plate with the adhesive was brought in contact with the skin matrix of the Biomax® UF filter.

The plate with the filter was removed from the aligning fixture and placed into a clamping module. The clamping module held the filter and plate together by compressing a soft silicone sheet against them.

The clamping module with the plate and filter clamped was passed through a light tunnel to cure the adhesive. The light was in the visible spectrum delivering 300 WPI. The feed rate was 4 feet per minute.

The plate was unclamped from the clamping module and was found to form an integral sealed device in all 384 wells.

Well integrity was determined with an assay developed to address leakage between adjacent wells. 100 $\mu$ls of a marker solution, 2 mg/$\mu$l pUC 19 plasmid DNA from Elim Biopharmaceuticals of So. San Francisco, Calif. was dispensed into every other well. The same volume of a clean buffer solution was dispensed into the other wells creating a checkerboard pattern. The automated pipettor used was a Multimek 96 from Beckman Instruments of Fullerton, Calif. The solutions were drawn to waste by a vacuum applied to the underside of the plate. 100 $\mu$l of buffer solution was added to all the wells and the plate was agitated to resuspend the Puc 19 DNA. The Multimek drew up 25 $\mu$ls from each well and transferred it to a clear polystyrene solid bottom plate then mixed in 25 $\mu$ls of SYBR green 1 nucleic gold stain manufactured by Molecular Probes of Eugene Oreg. at a [1:6000] dilution. The solid bottom plate was place into a Tecan SeptraFLUOR Plus plate reader manufactured by Tecan Austria .Ges.m.b.H. The excitation wavelength was at 485 nm and emission wavelength was at 535 nm. Integral wells meaning no crosstalk between wells was determined when the clean wells read no signal and the pUC 19 wells read hot.

EXAMPLE 2
1536 Well Plate

The 1536 plate was made using the same process as that of the 384 well plate above, but the adhesive dispense was set for a 2.25 mm spacing. The plate was a solid bottom clear polystyrene from Griener America Inc. of Lake Mary, Fla., was modified by machining the bottoms of the wells off.

EXAMPLE 3
384 with Regenerated Cellulose UF Filter

Plates using regenerated cellulose filters, YM and PL filters, available from Millipore Corporation of Bedford, Mass. were made with the same process as the 384 plate above, except the filters had the following preparation done to them prior to assembly.

The filter was fed into a Studio 7 vinyl cutter manufactured by IOLINE Inc. The tool used was 3 sided carbide cutter with a lead edge ground at a 45° angle. The cutter was programmed to cut a grid of crossing lines on a 4.5 mm spacing. The cutter depth was set to cut through the UF skin matrix plus 0.001 inch (0.0254 mm) to 0.002 inch (0.0508 mm) into the filter support structure. The gridded patterns were cut into 3 inch (76.2 mm)×4.4 inch(111.76 mm) sheets. The sheets were positioned into the alignment fixture so that the adhesive on the plate lined up with the cuts in the filter when assembled. The assembly was transferred to a clamping fixture and passed through the light to cure the adhesive.

An integral seal was obtained in most wells. Well failures were determined to be misalignments of the cut filter to the dispensed adhesive.

EXAMPLE 4

384 Well Plate with MF Filter

A 384 well plate was made using the same process as that of the well plate of Example 1 with the adhesive dispense on 4.5 mm spacing which corresponds to a 384 well format spacing. The plate was the same plate type as the one used in Example 1. The filter was a DURAPORE® filter, nominal pore size of 0.45 microns available from Millipore Corporation of Bedford, Mass. The adhesive was light curing Loctite 3211 as used in Example 1.

The wells each formed an integral liquid tight seal with the plate surface.

The above examples are not to be construed as limiting the scope of the subject invention, which is set forth in the claims below. Those of ordinary skill in the art will appreciate the types of filters appropriate to practice the present invention.

What is claimed is:

1. A multi well filter plate for filtering a liquid comprising,
a plate having top and bottom surfaces,
a plurality of holes passing through said plate,
a filter having a first and second surface,
said first surface of said filter being sealed to said bottom surface of said plate,
said seal being an adhesive,
said seal being liquid tight so that when a sample is placed in said holes and a pressure differential is applied between said top and bottom surfaces the liquid passes through said filter and wherein the surface of the plate to which the filter is bonded has a series of troughs formed around the holes into which the adhesive is placed.

2. A multi well filter plate for filtering a liquid comprising,
a plate having top and bottom surfaces,
a plurality of holes passing through said plate,
a filter having a first and second surface,
said first surface of said filter being sealed to said bottom surface of said plate,
said seal being an adhesive,
said seal being liquid tight so that when a sample is placed in said holes and a pressure differential is applied between said top and bottom surfaces the liquid passes through said filter and wherein the first surface of the filter has cuts through at least a portion of the depth of the first surface, the filter being attached by its first surface to the bottom surface of the plate so as to form a seal between the plate bottom and the seal being the adhesive bonded to the cuts in the first surface of the filter.

3. A multi well filter plate for filtering a liquid comprising,
a plate having top and bottom surfaces,
a plurality of holes passing through said plate,
a filter having a first and second surface,
said first surface of said filter being sealed to said bottom surface of said plate,
said seal being an adhesive,
said seal being liquid tight so that when a sample is placed in said holes and a pressure differential is applied between said top and bottom surfaces the liquid passes through said filter and wherein the filter is an ultrafiltration filter, the first surface of the filter having a smaller pore size than the second surface, the first surface of the ultrafiltration filter having cuts through at least a portion of the depth of the first surface, the ultrafiltration filter being attached by its first surface to the bottom surface of the plate so as to form a seal between the plate bottom and the ultrafiltration filter and the seal being an adhesive banded to the cuts in the first surface of the filter.

4. The plate of claim 1 wherein the filter is selected from the group consisting of microporous and ultrafiltration filters.

5. The plate of claim 2 wherein the filter is selected from the group consisting of microporous and ultrafiltration filters.

6. The plate of claim 1 wherein the filter is a microporous filter.

7. The plate of claim 1 wherein the filter is an ultrafiltration filter.

8. The plate of claim 2 wherein the filter is a microporous filter.

9. The plate of claim 2 wherein the filter is an ultrafiltration filter.

* * * * *